United States Patent
Hsu

(10) Patent No.: US 6,877,210 B2
(45) Date of Patent: Apr. 12, 2005

(54) ELECTROFRICTION METHOD OF MANUFACTURING SQUIRREL CAGE ROTORS

(75) Inventor: John S. Hsu, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 212 days.

(21) Appl. No.: 10/345,550

(22) Filed: Jan. 16, 2003

(65) Prior Publication Data

US 2004/0139596 A1 Jul. 22, 2004

(51) Int. Cl.[7] ................... H02K 15/02; H02K 15/10
(52) U.S. Cl. ................ 29/598; 29/596; 219/76.13; 228/2.1; 228/112.1; 310/42; 310/211; 310/212
(58) Field of Search .............. 29/598, 596; 310/42, 310/211, 212; 228/2.1, 112.1; 219/76.13

(56) References Cited

U.S. PATENT DOCUMENTS

| | | | | |
|---|---|---|---|---|
| 5,156,316 A | * | 10/1992 | Nied et al. .................. 228/2.1 |
| 5,829,664 A | * | 11/1998 | Spinella et al. .......... 228/112.1 |
| 6,088,906 A | * | 7/2000 | Hsu et al. ..................... 29/598 |
| 6,417,477 B1 | * | 7/2002 | Brown et al. ............ 219/76.13 |

* cited by examiner

Primary Examiner—Carl J. Arbes
Assistant Examiner—Tim Phan
(74) Attorney, Agent, or Firm—Kirk A. Wilson

(57) ABSTRACT

A method of making a squirrel cage rotor of copper material for use in AC or DC motors, includes forming a core with longitudinal slots, inserting bars of conductive material in the slots, with ends extending out of opposite ends of the core, and joining the end rings to the bars, wherein the conductive material of either the end rings or the bars is copper. Various methods of joining the end rings to the bars are disclosed including electrofriction welding, current pulse welding and brazing, transient liquid phase joining and casting. Pressure is also applied to the end rings to improve contact and reduce areas of small or uneven contact between the bar ends and the end rings. Rotors made with such methods are also disclosed.

12 Claims, 8 Drawing Sheets

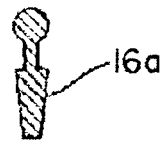 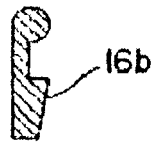 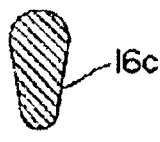 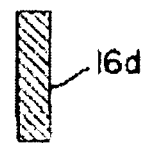
*Fig. 7a*    *Fig. 7b*    *Fig. 7c*    *Fig. 7d*
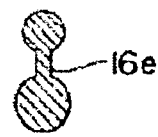 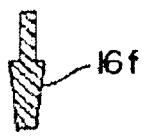 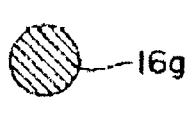
*Fig. 7e*    *Fig. 7f*    *Fig. 7g*
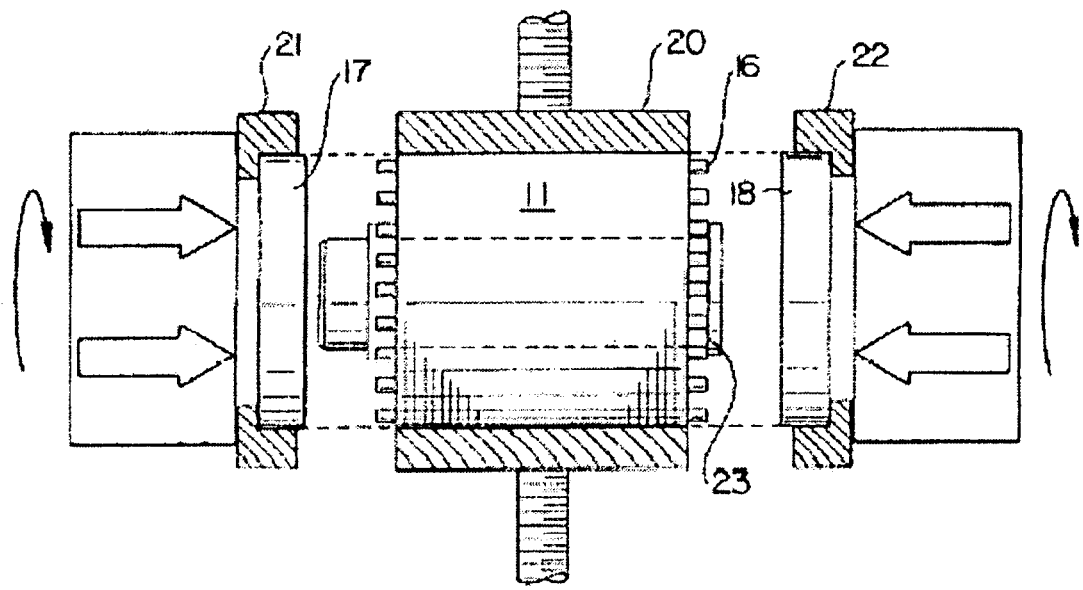
*Fig. 8*

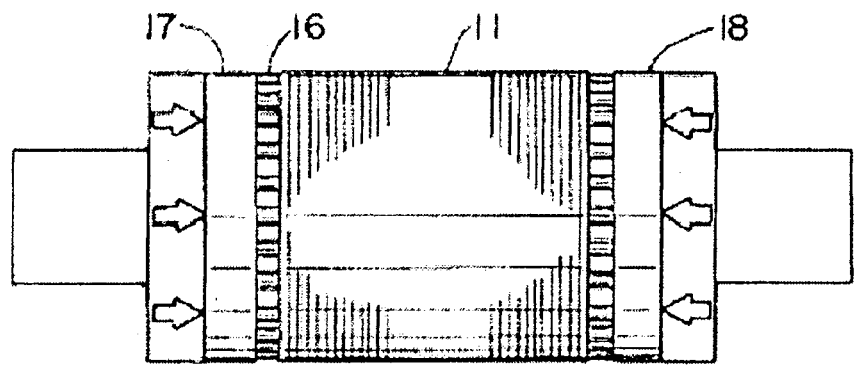
Fig. 9
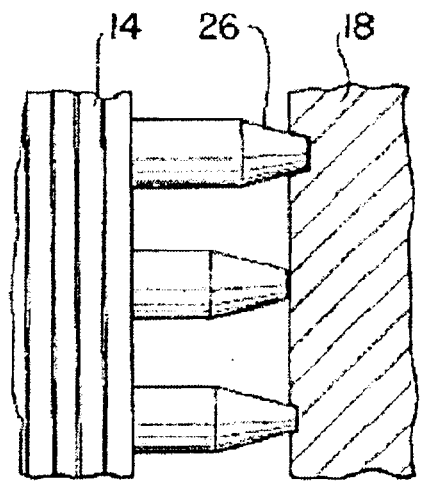
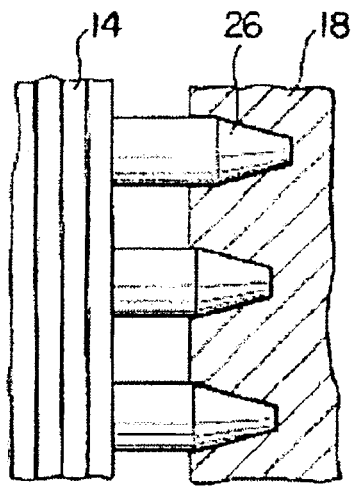
Fig. 12a          Fig. 12b
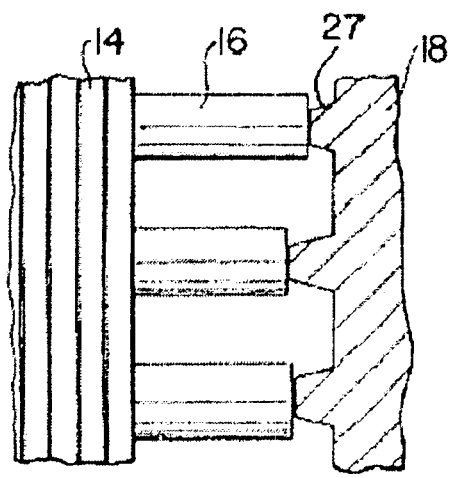
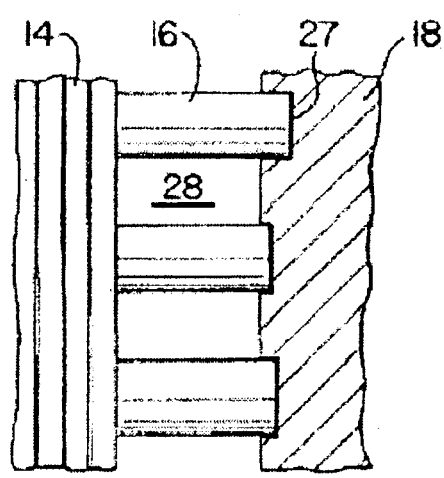
Fig. 13a          Fig. 13b

ELECTROFRICTION METHOD OF MANUFACTURING SQUIRREL CAGE ROTORS

STATEMENT REGARDING FEDERAL SPONSORSHIP

The United States Government has rights in this invention pursuant to contract no. DE-AC05-00OR22725 between the United States Department of Energy and UT-Battelle, LLC.

FIELD OF THE INVENTION

The present invention relates to electrical motors and methods for manufacture of rotors used in such motors.

BACKGROUND OF THE INVENTION

Friction welding can be used to join the same or different metals together. An improved friction weld technology for joining the rotor bars and the rotor end rings for the induction motors is the subject of this invention. U.S. Pat. No. 6,088,906, issued Jul. 18, 2000 and herein incorporated by reference, teaches welding methods that do not use electric current for generating resistance heat at the weld joints. The invention described herein is a further development for the friction weld that demands lesser friction force by utilizing electric current to produce resistance heating and compensate for reduced heat generated by friction at the weld joint.

Roughly two-thirds of the electricity generated for industry in the United States is used to power electric motors. Approximately one billion motors are in use in the United States. Electric motors are used for machine tools, pumps, fans, compressors and many other industrial, commercial and residential loads.

Many of these motors are small AC induction motors having die cast aluminum squirrel cage rotors. An operating characteristic of these motors, known as "slip," is generally proportional to the electrical resistance in the rotor. Lower resistance produces lower slip and greater efficiency at load-carrying operating points. The resistance of copper is lower than aluminum. The use of copper in such rotors can increase the efficiency of the motor by 2% of the total input energy. Current manufacturing methods using copper need improvement for success in manufacture of small horsepower motors. Currently, a silver-copper brazing technique is used for large horsepower motors, and this method is expensive and slow and not cost effective for smaller horsepower motors.

Another possible method for making a copper rotor is die casting, but copper die-casting requires high operating temperatures, which are higher than those required for aluminum die-casting. Furthermore, the dies for copper die-casting do not have sufficient life for larger scale production. It is therefore, desirable to use preformed or extruded bars in the rotor, and to join these, bars to end rings.

BRIEF SUMMARY OF THE INVENTION

The invention relates to a rotor for an electrical machine and a method of manufacture using new metallurgical methods for joining metal bars and end rings in manufacturing the rotor. The invention also relates to increasing the copper in such rotors by providing the improved methods for joining copper materials to other copper materials or to aluminum materials. Although the invention finds application in AC induction motors, it can also be applied to other types of electrical machines including, but not limited to, homopolar DC motors.

The method of the invention includes the steps of inserting conductors of conductive material in respective slots of a core with slots running longitudinally therein, the conductors extending longitudinally through the core and the conductors having ends extending out of opposite ends of said core, pressing end rings of conductive material into contact with the ends of the conductors on opposite ends of the core, and joining the end rings to the conductors, wherein the conductive material of either the end rings or the conductors, or both, is copper.

The methods of the invention include electrofriction welding, pulsed current welding and brazing, transient liquid phase joining and casting. Pressure is also applied to the end rings to improve contact and reduce areas of small or uneven contact between the bar ends and the end rings. Electric current generates resistance heating and friction produces heat at the joint thereby requiring lighter friction force and causing less deformation of the components being welded as compared to friction welding only.

The invention also relates to rotors made according to the above methods.

These and other objects of the present invention will become readily apparent upon further review of the following specification and the drawings which are incorporated herein and which describe and illustrate several preferred embodiments of the invention. Such embodiments are not, however, exhaustive of all possible embodiments, and therefore reference should be made to the claims which follow the description for the legal scope of the invention.

BRIEF DESCRIPTION OF THE DRAWINGS

FIGS. 7a–7g are detail sectional views of bars for use in the embodiment in FIGS. 5 and 6;

FIG. 8 is an elevational view of a friction welding method of making the rotor of FIGS. 5 and 6;

FIG. 9 is an elevational view of one step in the methods of making the rotor of FIGS. 5 and 6 according to the present invention;

FIGS. 12a, 12b, 13a and 13b are detail views of end joints assembled according to the method of FIG. 10;

DETAILED DESCRIPTION OF THE INVENTION

Figure 1:
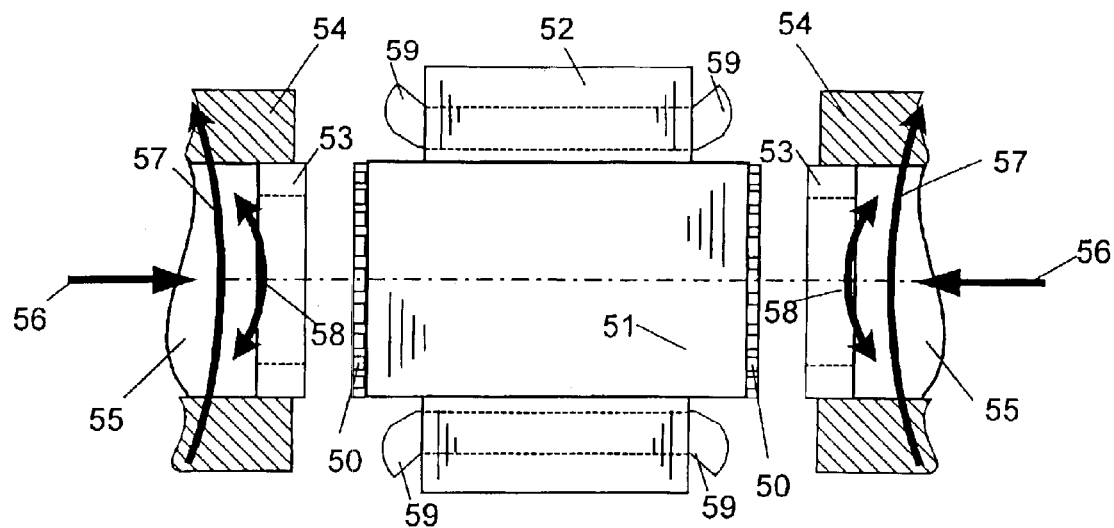
FIG. 1 is and elevational view showing typical components of and electrofriction weld for a squirrel cage rotor of an induction motor.

In conventional friction welding, the friction occurs when there is relative (sliding) motion at the interface of the surfaces in contact under pressure. All metal surfaces are microscopically rough, no matter how smooth they appear. Friction between the contacting surfaces of metals is mostly due to local adhesion. When surfaces are pressed together, local bonding occurs in a few small patches where the largest asperities make contact. To overcome this local adhesion, a force great enough to pull apart the bonded regions must be applied. The force magnitude of this static friction, $F_{smax}$, is equal to the product of the coefficient of static friction, $\mu^s$, and the normal force, N, that is pressing the two metals together. The equation is:

$$F_{smax} = \mu_s N$$

Once contacting surfaces are in relative motion, another form of friction may result when the asperities of one metal dig into the other metal with a plowing effect. The friction force, $F_k$, of this kinetic (or sliding) friction is equal to the product of the coefficient of kinetic friction, $\mu_k$, and the normal force, N. The equation is:

$$F_k = \mu_k N$$

The heat increment produced by the friction weld is proportional to the energy increment associated with the average kinetic friction force and the average distance traveled of the relative motion. It can be expressed as follows:

$$\Delta Energy = \mu_k N \omega R \, \Delta t$$

Where $\omega$ is the angular velocity of the relative motion of the two metals being welded, R is the average radius, and $\Delta t$ is the time increment. Obviously, the higher force, N, pressing on the metals, the faster angular velocity, $\omega$, the bigger radius, R, and the longer time, $\Delta t$, would result in a greater $\Delta$Energy and thus more heat.

It is commonly known that when heat is added to a metal, the energy goes to increase the random molecular motion, which results in a temperature rise, and to increase the potential energy associated with the molecular bonds. Different metals have different molecular configurations and bonding. Thus, if equal amounts of heat are added to equal masses of different metals, the resulting temperature rises will generally be different. The amount of heat, Q, required to change the temperature of a metal is proportional to the mass, m, of the metal and to the change in the temperature ($\Delta T$). The heat transfer equation is:

$$Q = mc\Delta T$$

Where constant c is commonly referred to as the specific heat. For example, the specific heat for iron is 460 J/kg*C, for aluminum is 920 J/kg*C, and for copper is 390 J/kg*C.

For friction weld, because enormous heat is needed to raise the temperature of the metals in a relatively short time, a very high pressing force is exerted to the metals being welded. This force would inevitably deform the joining metals. The concept of this invention is that in addition to friction, heat can also be generated by electric current going through the contacting surfaces of two metals at the joint. This produces less deformation than a pure friction weld. Electrofriction overcomes the drawbacks of a pure electric resistance weld, a drawback being that when multiple bars are being welded to the end rings, the contact situations of each individual bar-to-end-ring can be different, thereby allowing more current to pass through the one that is welded first and less current would pass to the one that is not quite welded and creating non-uniform welded joints. Less mechanical deformation and more uniform welding can be achieved due to the relative motion between the metal surfaces under a reasonable pressure and a controlled electric current until the sufficient heat is uniformly created among the contacting metals. The torque and electric current can be applied simultaneously. The electric current can be applied intermittently as needed.

FIG. 1 shows an embodiment of an electrofriction weld for a squirrel cage rotor of an induction motor. The rotor bars 50 are inserted in the rotor slots of the rotor core 51. The grasping force is applied to the rotor through the stationary collet 52 that has a primary winding 59 in it. The current in the primary winding 59 can be controlled for the best heat generation. Cooling means such as a water-cooled winding can be used to control the primary winding 59 temperature. The stationary collet 52 can be of a split structure that allows the rotor core 51 to be put inside or taken away from the stationary collet 52. When the spinning end rings 53 are being pushed towards the rotor bars 50 from both sides, the end rings 53 are making contact with the rotor bars 50. The electromotive force (EMF) induced in the bars from the primary winding produces a current that goes through the rotor bars 50 and the end rings 53. The magnitude of the current can be controlled by the input to the primary winding 59. Because of the contact resistance, the major heat would be produced at the joints. The friction and the rotation 57 or the bi-directional oscillation 58 would make the heat production uniformly distributed among the joints. The friction force can be taken away once the weld is completed. The ways to take away the friction force are either to allow the rotor core 51 to be freed from the stationary collet 52 or to stop the rotation 57 or oscillation 58 of the two end rings 53 by loosening or stopping the rotating collets 54. The motion of the rotating collets 54 can be either a single direction rotation 57 or an oscillating bi-directional motion 58. Liquid cooling may be needed to prevent the temperature buildup of the rotating backstops 55. The forging force 56 is applied normal to the center axis of the rotor core 51.

Figure 2:
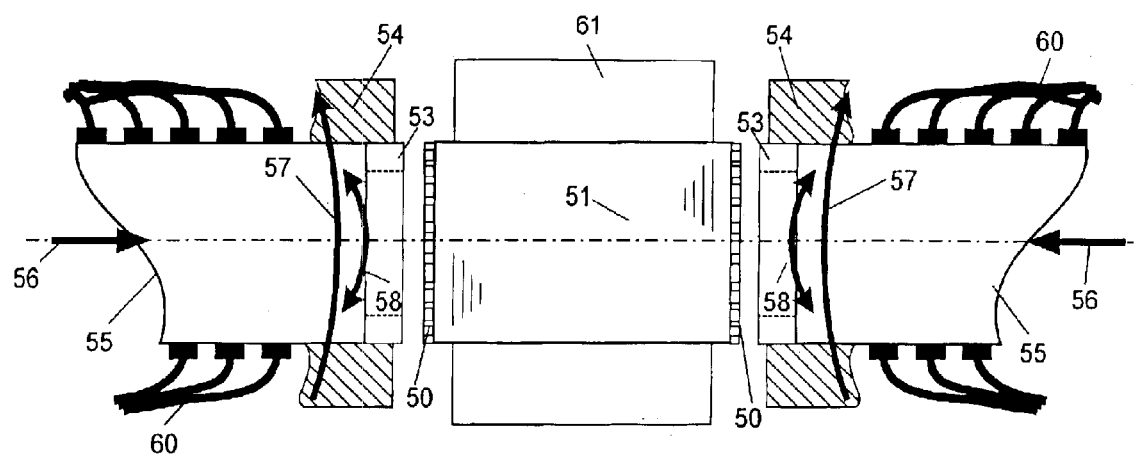
FIG. 2 is and elevational view showing typical components of and electrofriction weld using brushes for supplying electricity to the rotor bars and rotor end rings.
Figure 3:
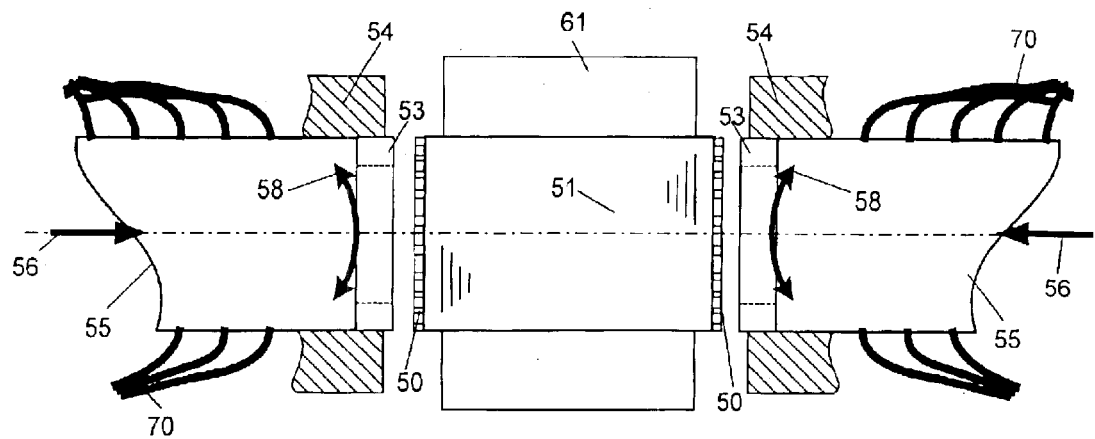
FIG. 3 is and elevational view showing typical components of and electrofriction weld using leads for supplying electricity to the rotor bars and rotor end rings.

Alternative embodiments that bear the same concept of combining electric resistance and friction welds together can be used. FIG. 2 illustrates an embodiment of an electrofriction weld with brushes 60 for supplying electricity to the rotor bars 50 and rotor end rings 53. The primary winding 59 as shown in FIG. 1 is eliminated in the stationery collet 61. The electric current goes through the brushes 60 and the rotating or oscillating backstops 55 to the end rings 53 and rotor bars 50. The rotating or oscillating backstops 55 would have liquid cooling tubes inside to prevent the unwanted weld between the backstop 55 and the end ring 53. It should be pointed out that if the amplitude of the oscillation motion 58 is small, the brushes 60 could be omitted and replaced by the flexible leads 70 connected to the backstops directly as shown in FIG. 3.

Figure 4:
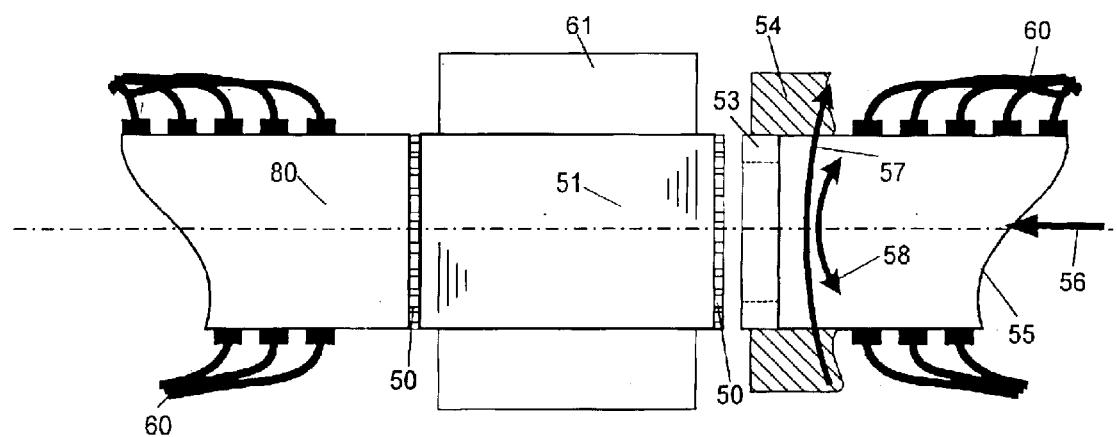
FIG. 4 is and elevational view showing typical components of and electrofriction weld for welding one side of the bars to a ring first and then the other side.

FIG. 4 shows an embodiment of an electrofriction weld for welding one side of the bars to a ring first and then the other side. For this embodiment, the electrical current can be provided by any means described in FIGS. 1–3. Stationary backstop 80 can be used to prevent rotation of the rotor core 51. Either oscillation 58 or rotation 57 can be used for the friction weld portion. If the amplitude of the oscillation 58 is small, flexible leads 70 (see FIG. 3) can be connected to the backstops directly without having the brushes 60.

Figure 5:
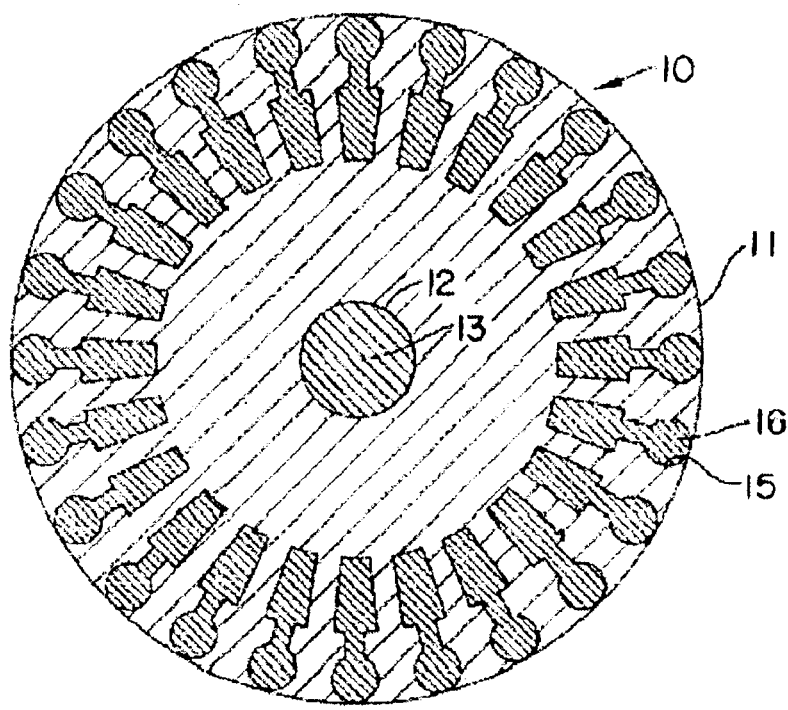
FIG. 5 is a transverse sectional view of a first embodiment of the invention taken in the plane indicated by line 1—1 in FIG. 2.
Figure 6:
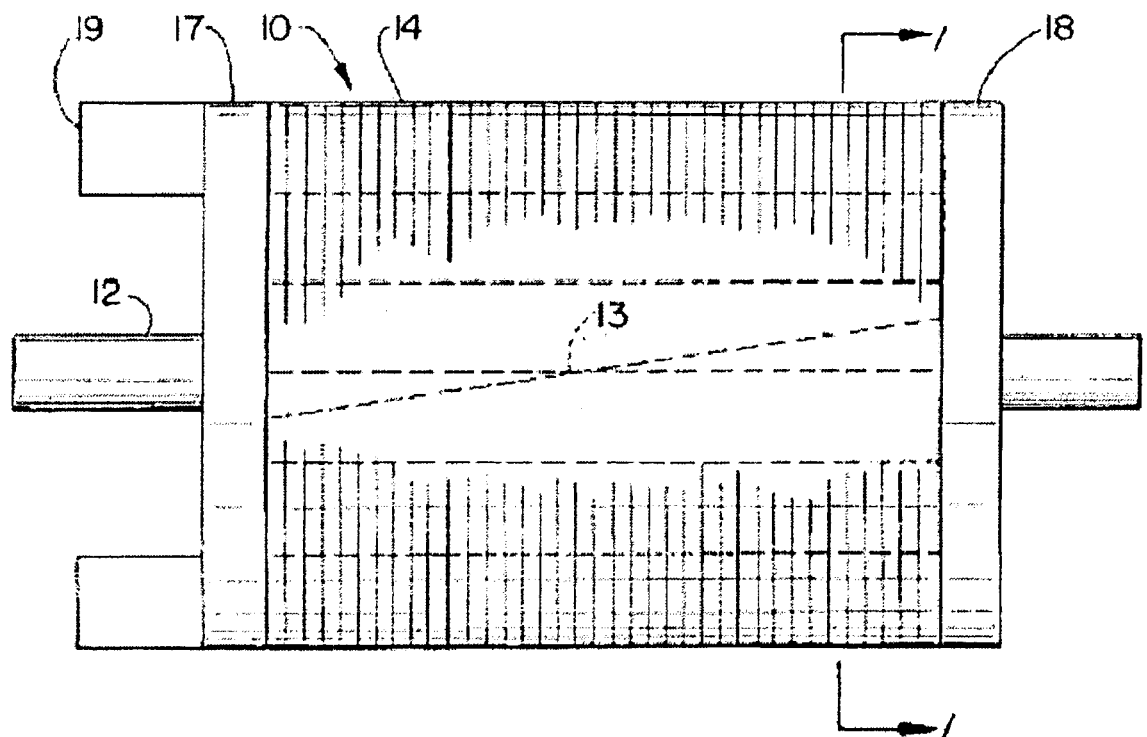
FIG. 6 is a longitudinal view in elevation of a rotor made according to the present invention.

FIGS. 5 and 6 show a squirrel cage rotor 10 with a cylindrical core 11 and a rotor shaft 12 extending along a central axis 13 of the core 11 for rotation of the rotor 10 around the axis. The core 11 is formed of a plurality of stacked metal sheets 14 shown in FIG. 6 which are insulated from each other and clamped together to form the laminated core 11 seen in FIG. 6. The core 11 has slots 15 running longitudinally and opening to its outer perimeter. Inside the slots 15 are bars or conductors 16, which are solid metal elongated members which can be made of aluminum or copper, and which are preferably made of a copper material for the present invention, due to the higher conductivity and lower resistance of copper in comparison with aluminum. The copper material may be pure copper or an alloy of copper and other materials. The bars 16 are preferably preformed and inserted into the slots 15 as opposed to being cast within the slots 15.

At opposite ends of the rotor 10 are end rings, 17, 18, with end ring 18 having blades 19 for ventilating the motor. The end rings 17, 18 are also preferably made of a copper material, but could be made of an aluminum material in combination with copper bars 15. Conversely, the invention also contemplates an embodiment with bars of aluminum material and end rings of a copper material, with the object being to increase the use of multiple stack rotors in various kinds of AC and DC motors. It should be understood that aluminum material refers to a material of pure aluminum or an alloy including aluminum.

The configuration of the bars or conductors 16a–16g, when viewed in cross section, may take many shapes and still come within the scope of the invention. FIGS. 7a–7g show just some of the shapes which the bars 16a–16g can take, including a keyhole shape in FIGS. 7a, 7b, 7e and 7f for double cage rotors, a rectangular shape in FIG. 7d for deep bar rotors, and a circular shape in FIG. 7g for single cage rotors. The selection of the best shape for a particular motor is based on the motor specifications including starting torque, pull-up torque, break-down torque, starting current and other parameters.

FIG. 8 shows a rotor 10 made with extruded or preformed copper or aluminum bars 16 and either aluminum or copper end rings 17, 18. The core 11 is formed of laminations which are held together by an arbor 23 as the bars 16 are inserted in the slots, with ends extending a short distance outside the core 11 on either end. The core 11 is clamped by a fixture 20. The end rings are first rotated around their rotational axes (represented by the arcuate arrows) at a suitable high speed. The rotating end rings 17, 18 are then simultaneously pushed into contact with the ends of the bars (as represented by the horizontal arrows). In one type of welding process, the mandrels 21, 22 carrying the end rings are braked to a stop. The resultant frictional heating causes the ends of the bars and the contacting surfaces of the rings to fuse into a metallurgical joint. In another type of welding, a large inertial mass is rotated with the mandrels 21, 22 and end rings 17, 18. These decelerate after being pushed against the ends of the bars 16 until the occurrence of the weld itself stops the end rings 17, 18 from rotating further. It is also possible to apply a higher axial pressure and high axial current to the end rings 17, 18 using the methods of FIGS. 6 and 7 to fuse the end rings 17, 18 to the bars. The current is then reduced, with mechanical pressure maintained during a cool-down step.

FIGS. 9, 12a, 12b, 13a and 13b show a step for overcoming the problem of non-touching between the bars 16 and the end rings 16, 17 at areas of reduced cross section contact between the bars 16 and the end rings 17, 18. Interfacing gaps can be eliminated by applying pressure to the end rings 17, 18 as shown in FIG. 9, with the results shown in FIGS. 12b and 13b from two respective starting positions shown in FIGS. 12a and 13a, respectively. In FIG. 12b the tapered ends 26 of the bars 16 provide higher initial resistance for heat generation at the joints. The tapered ends become embedded in the end ring 18. In FIG. 13b, the projections 27 on the end ring 18 have become flattened and material of the end ring 18 projects into the gaps 28 between ends of the bars 16. These steps eliminate areas of reduced cross section, which are areas of higher resistance.

Figure 10:
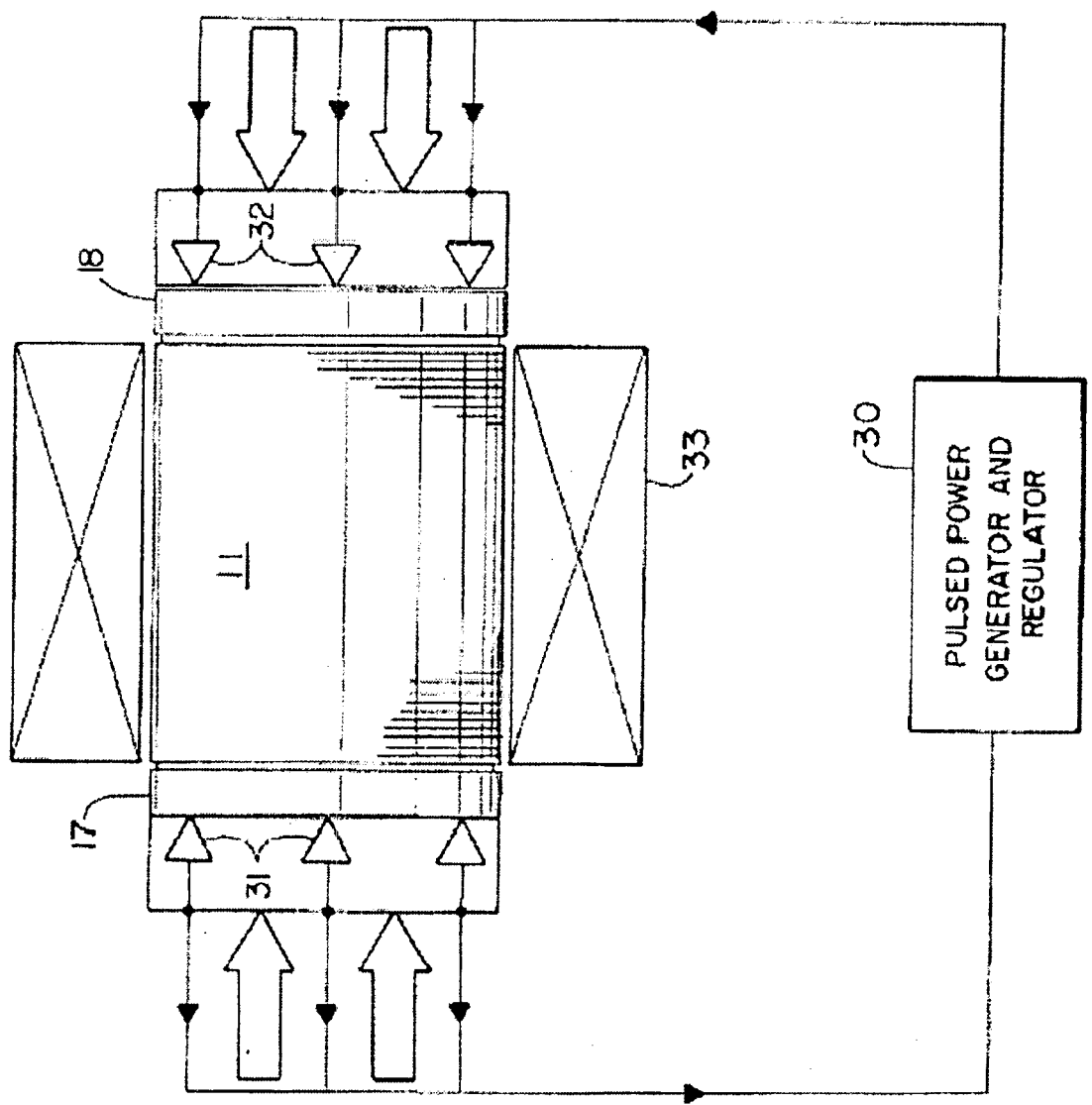
FIG. 10 is a schematic view of a pulse welding method of making the rotor of FIGS. 5 and 6.
Figure 11:
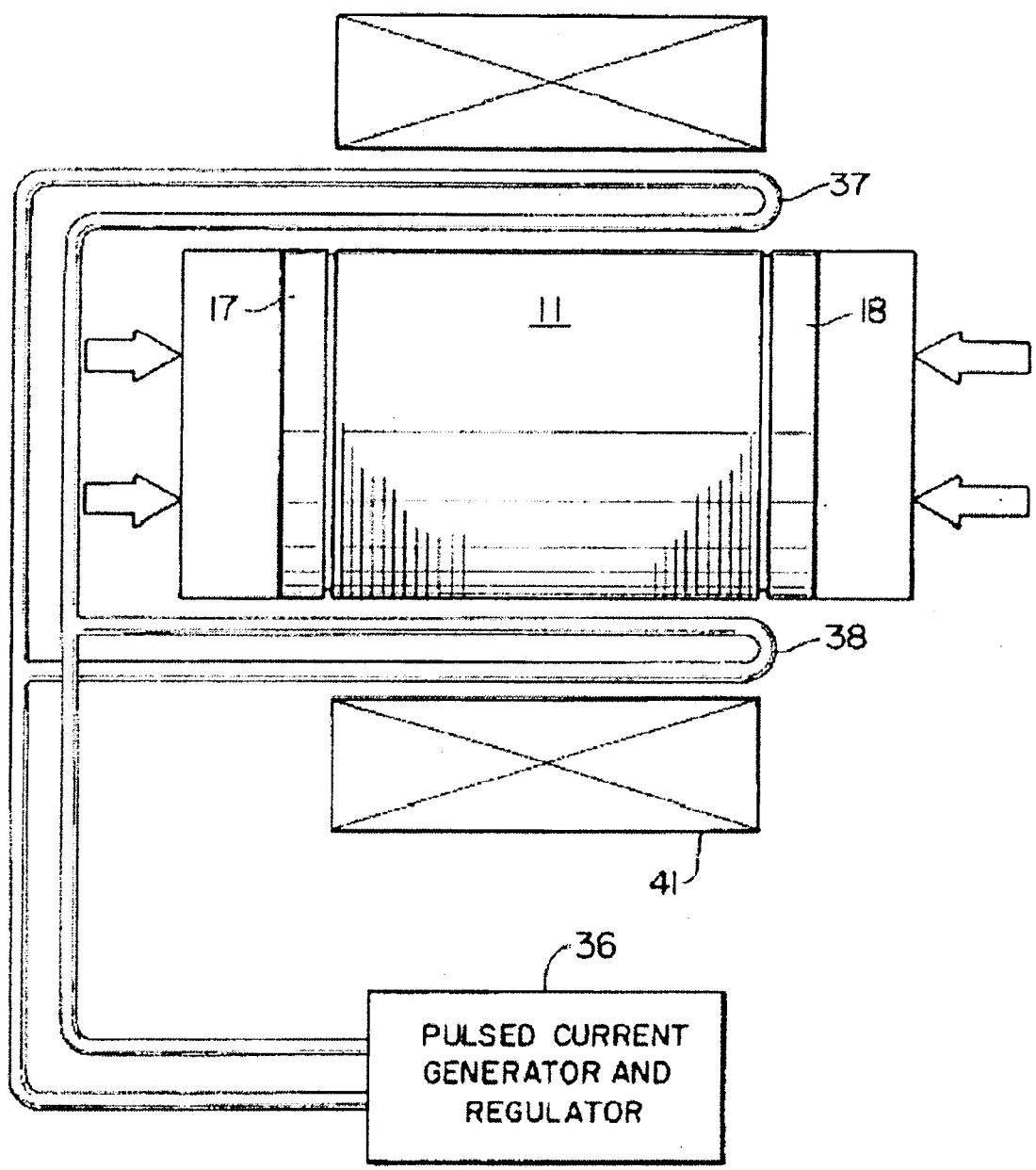
FIG. 11 is a schematic view of an alternative pulse welding method of making the rotor of FIGS. 5 and 6.

FIGS. 10 and 11 show two arrangements for welding the end rings 17, 18 to the rotor conductor bars 16. FIG. 10 illustrates an arrangement with a pulse generator 30 and electrodes 31, 32 for passing a large power pulse through the end rings 17, 18 to weld the rings 17, 18 to the bars 16. The electrodes 31, 32 contact the end rings 17, 18 on opposite ends, are evenly distributed across the face of the end rings 17, 18 with stacking pressure being applied, and may be water-cooled. It is also possible to use a magnetic chamber, represented by magnet coil 33, to introduce additional leakage reactance into bars 16. This equalizes currents in the individual joints between rings 17, 18 and bars 16.

FIG. 11 shows an arrangement for welding in which a pulsed current generator 36 connects to two current windings 37, 38 which act as a primary winding and induce a current in the rotor bars (not shown) and end rings 17, 18 which act as a secondary winding. A magnetic coil 41 is used to provide a return path for flux in the rotor 10.

Figure 14:
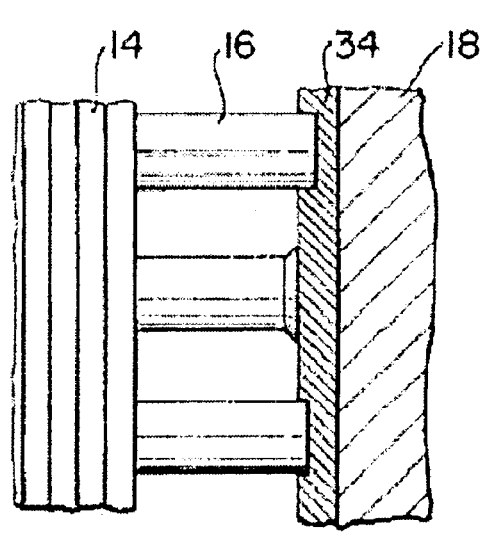
FIGS. 14 and 15 are detail views of end joints assembled according to the methods of FIGS. 9, 10 and 11.

As seen in FIG. 14, a foil of a brazing alloy 34 such as silver solder or nickel-based alloy can be placed between the ends of the bars 16 and the end rings 17, 18. When a pulse is passed through the end rings 17, 18 using the method of FIG. 10 or 11, the joints are heated and the bars 16 effectively joined by a braze joint 34 to the end rings 17, 18. The rings 17, 18 can be pressed against the ends of the bars 16 (FIG. 9) with the effect of deforming either the ends of the bars 16 or the end rings 17, 18 and improving the joint between them.

Figure 15:
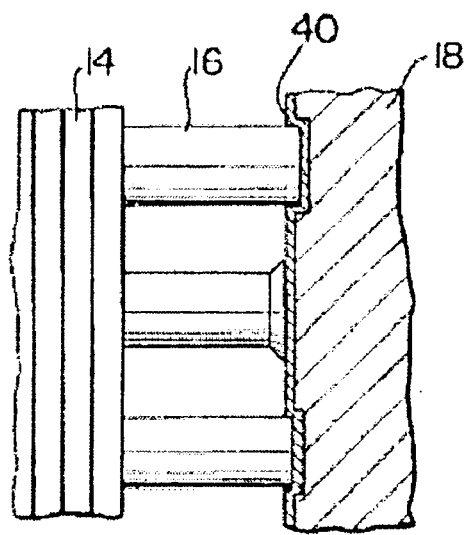

Referring to FIG. 15, it is also possible to form joints using eutectics which exhibit a transient liquid phase when in contact with copper at elevated temperature. These materials include manganese (having a eutectic melting point of 868.degree. C.) silicon (having a eutectic melting point of 802.degree. C.) and silver (having a eutectic melting point of 780.degree. C.). A very thin coating 40 in the range of 0.00025 in.–0.0005 in. is applied to the surface of the joint by electroplating or physical vapor deposition. The rings 17, 18 are then clamped against the ends of the bars 16 and joints are heated to slightly above the eutectic temperature. The resulting liquid phase would wet the ends of the bars 16, and surfaces of the end rings and form a joint as shown in FIG. 15 (where the thickness of joint 40 has been exaggerated). Heating can be accomplished by one of the pulsed current methods of FIG. 10 or 11, or in a furnace.

The eutectic process could also be performed with aluminum bars or aluminum end rings joined to copper. Three materials that form eutectics with aluminum are silicon (having a eutectic melting point of 577.degree. C.), copper (having a eutectic melting point of 548.degree. C.) and germanium (having a eutectic melting point of 420.degree. C.). The eutectic-forming material is applied by vacuum sputtering to avoid forming a layer of aluminum oxide on the aluminum parts. Heating can be carried out by resistance heating or in a vacuum furnace.

Figure 16:
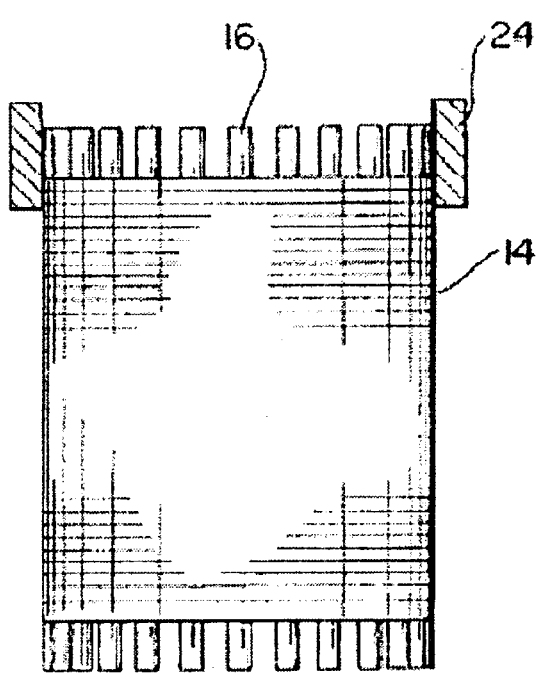
FIGS. 16 and 17 are elevational views of another method of making the rotor of FIGS. 5 and 6 according to the present invention.
Figure 17:
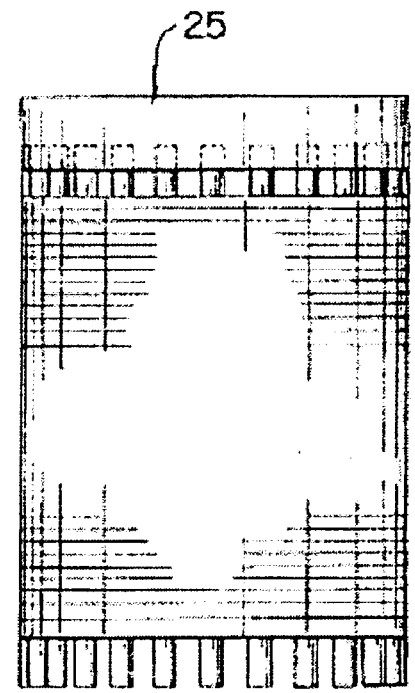

Referring next to FIGS. 16 and 17, another method of joining end rings 17, 18 to the bars 15 is as follows. The stacked core laminations 14 are held vertically with the preformed copper bars 16 again extending out of opposite ends. A mold 24 is placed around the upper end, and molten metal is poured into the mold and allowed to solidify in the form of an end-ring casting 25.

This has been a description of how the invention can be carried out. Those of ordinary skill in the art will recognize that various details may be modified in arriving at other detailed embodiments, and these embodiments will come within the scope of the invention.

I claim:

1. A method of making a rotor for an electrical machine, the method comprising the steps of:
   - inserting conductors of conductive material in respective slots of a core with slots running longitudinally therein, the conductors extending longitudinally through the core and the conductors having ends extending out of an end of said core forming a discontinuous conductive surface at said core end:
   - pressing a continuous surface of an end ring of conductive material into contact with said discontinuous conductive surface;
   - joining said continuous surface of said end ring to the discontinuous conductive surface, wherein the conductive material of either the end ring or the conductors is aluminum or aluminum alloy; and
   - wherein the joining step includes applying torque to one of said surfaces in a oscillating bidirectional rotational direction to create friction and applying electrical current at the joint to create resistance heating.

2. The method of claim 1, wherein the end rings are made of an aluminum material and the conductors are made of a copper material.

3. The method of claim 1, wherein the end rings are made of a copper material end the conductors are made of an aluminum material.

4. The method of claim 1, in which the conductor ends are tapered.

5. The method of claim 1, in which a projection extends axially from said end ring continuous surface, wherein the pressing step includes pressing said projection into contact with said discontinuous surface, and the joining step further includes deforming said projection.

6. The method of claim 1 wherein said electrical current is direct current.

7. The method of claim 1 wherein said electrical current is alternating current.

8. The method of claim 1 wherein said electrical current is applied using a primary winding.

9. The method of claim 1 wherein said electrical current is applied using brushes.

10. The method of claim 1 wherein said electrical current is applied using leads.

11. The method of claim 1 wherein said torque and electrical current is applied simultaneously.

12. The method of claim 1 wherein said electrical current is applied intermittently.

* * * * *